Aug. 18, 1925. 1,550,643

F. A. BULLINGTON

RECIPROCATORY INTERNAL COMBUSTION ENGINE

Filed July 12, 1923 2 Sheets-Sheet 1

INVENTOR
Frank A Bullington
BY
ATTORNEY

Aug. 18, 1925.
F. A. BULLINGTON
1,550,643
RECIPROCATORY INTERNAL COMBUSTION ENGINE
Filed July 12, 1923    2 Sheets-Sheet 2
Fig. 3.
Fig. 5.
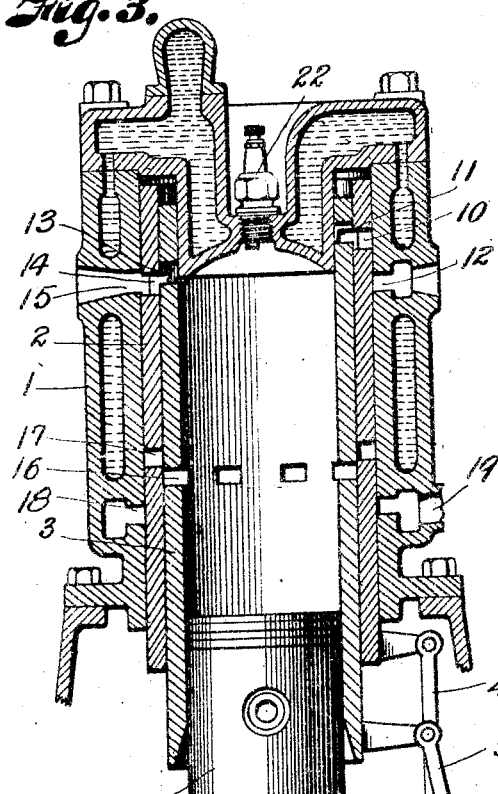
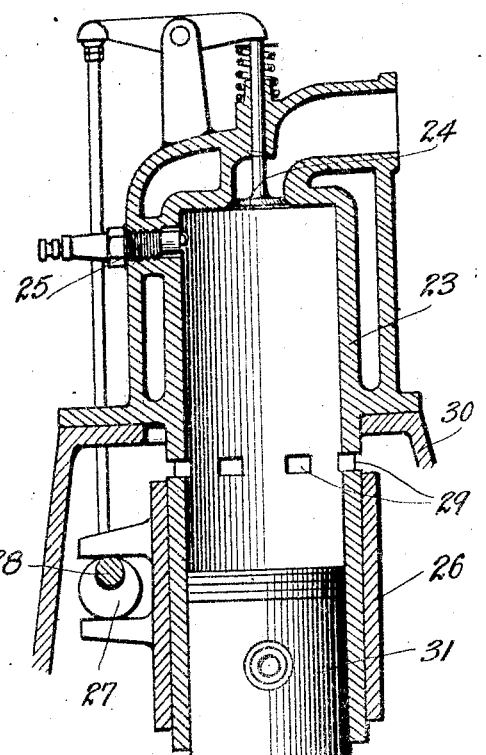
Fig. 4.
INVENTOR
Frank A. Bullington
BY
ATTORNEY Patented Aug. 18, 1925.

1,550,643

UNITED STATES PATENT OFFICE.

FRANK A. BULLINGTON, OF KANSAS CITY, MISSOURI, ASSIGNOR TO BULLINGTON MOTORS, OF KANSAS CITY, MISSOURI, A COMMON LAW TRUST.

RECIPROCATORY INTERNAL-COMBUSTION ENGINE.

Application filed July 12, 1923. Serial No. 651,042.

*To all whom it may concern:*

Be it known that I, FRANK A. BULLINGTON, a citizen of the United States, residing at Kansas City, in the county of Jackson and State of Missouri, have invented certain new and useful Improvements in Reciprocatory Internal-Combustion Engines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to internal combustion engines and the prime object thereof is to provide an engine which will possess certain inherent advantages over those engines which are now made according to standard engine parctice.

For example, my invention contemplates an internal combustion engine in which the expansion ratio of the working fluid is considerably in excess of the compression ratio of the engine and I have so constructed the engine that there will be a constant compression irrespective of variations in the quantity value of the admitted charge. The compression is insured by admitting varying quantities of volumetric fluid into the cylinder, the greater the fuel charge, the lesser the quantity of volumetric fluid and vice versa. In each case, however, the expansion ratio is greater than the compression ratio so that the full expansion value of the exploded charge may be used to perform useful work.

In carrying out the invention, the subject matter of the present application, I employ a reciprocatory sleeve valve which may be movable longitudinally of the cylinder and which covers and uncovers port cuttings in the cylinder to admit the volumetric fluid into the working chamber at about the end of the effective fuel intake stroke of the piston, the volumetric fluid being stratified with respect to the fuel charge. The length of the cylinder is such that the piston has an actual movement in excess of its effective intake stroke so the volumetric fluid is introduced to fill the space between the theoretical end of the compression chamber and the piston. This is desirable because the effective expansion stroke of the piston is greater than its effective compression stroke and the fluid admitted through the volumetric inlet ports makes up for the difference between the two strokes.

The amount of volumetric fluid may vary according to the amount of fuel introduced into the cylinder, the variation being in inverse ratio; that is, the greater the amount of fuel, the lesser the volumetric fluid and vice versa.

The reciprocatory sleeve valve may partake of various forms but I have shown my invention applied to the well known Knight engine in which the cylinder block is provided with two co-operating internal sleeve valves for opening and closing the admission and exhaust ports of the cylinder and in a modified form I have shown the invention as applied to the ordinary poppet valve type of engine.

I, therefore, do not wish to be limited to any particular adaptation of my invention to any particular engine but I reserve the right to make such changes in form, proportion and minor details of construction as properly come within the scope of the appended claims.

In the drawings,—

Fig. 3 is a similar view at the end of the expansion stroke and at the opening of the exhaust stroke, all the other ports being closed.

Fig. 4 is a detail view of the valve crank shaft, and

Fig. 5 is a sectional view of the invention applied to a poppet valve type of engine.

Figure 1:
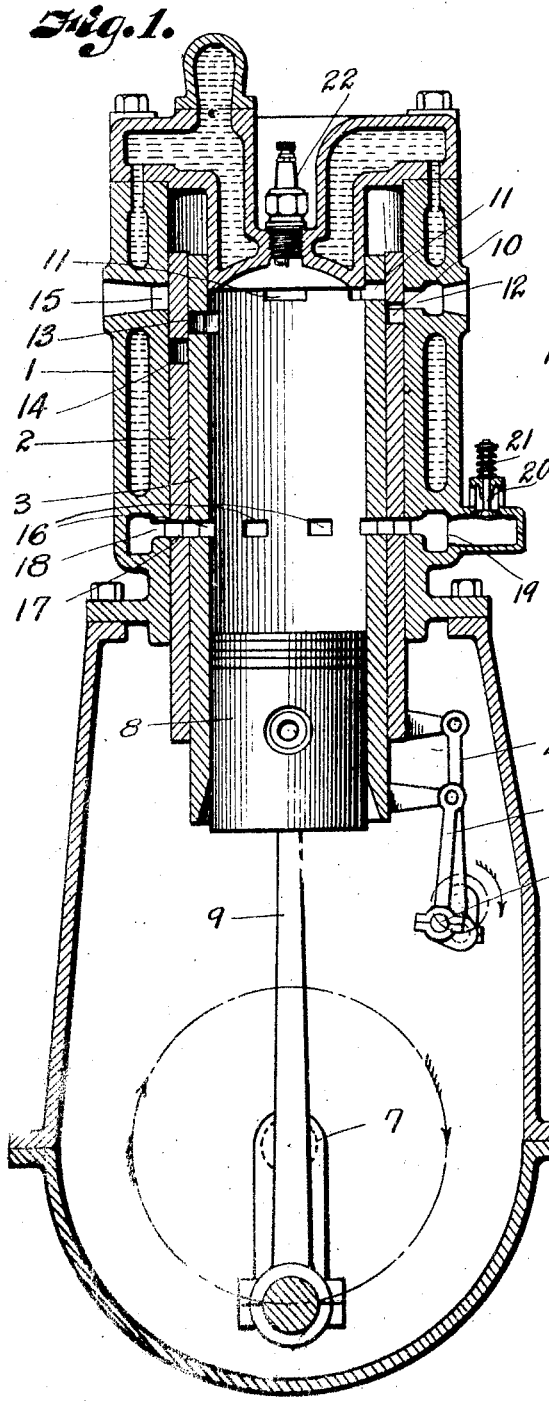
Fig. 1 is a sectional view through a known type of engine to which my invention is applied, the fuel intake ports being shown as just closing.
Figure 2:
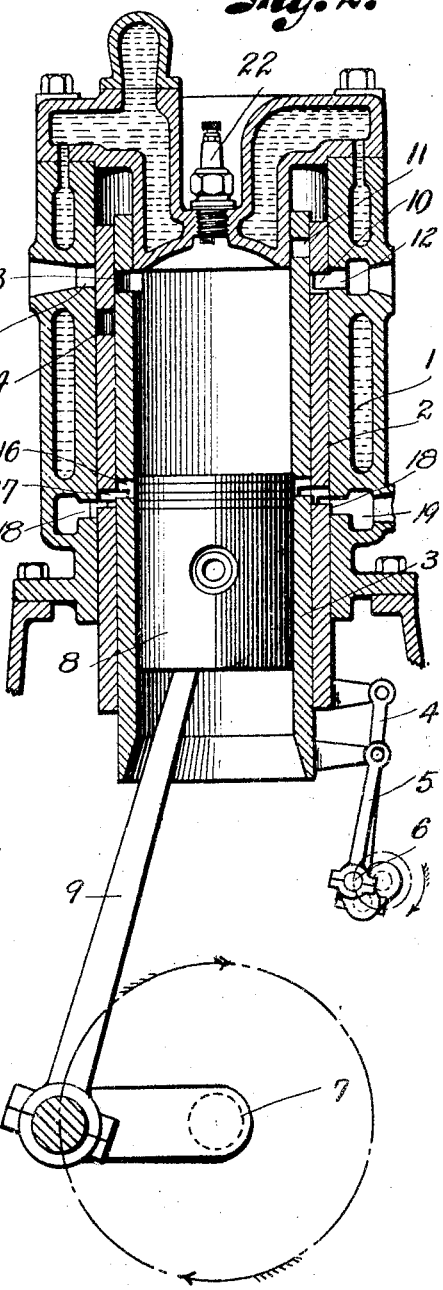
Fig. 2 is a similar view of the piston at the beginning of the compression stroke with the pressure fluid ports shown as beginning to close.

Referring now to the drawings by numerals of reference:

1 designates the engine block of the well known type of engine known as the Knight engine. 2 and 3 are the sleeve valves which are operated by the connecting rods 4 and 5 on the valve crank shaft 6, which is adapted to receive its motion from the main crank shaft 7 in any appropriate manner. The piston 8 drives the main crank shaft through the connecting rod 9 in the usual way, it being understood, of course, that the speed of the crank shaft 6 is half the speed of the crank shaft 7.

As the piston 8 rotates the crank shaft 7, it in turn communicates motion to the valve crank shaft 6 and through the connecting rods 4 and 5, the sleeves 2 and 3 are reciprocated to intermittently open the fuel inlet ports 10 and 11 (that is, to cause them to register with the intake port 12) and to intermittently register the exhaust port openings 13 and 14 with the exhaust port 15 in the engine block. The opening and closing of the inlet and exhaust ports is accomplished in alternate relation, as is well understood, and since the principle of the well known Knight engine is so thoroughly understood by those skilled in the art, it is thought it is unnecessary to elaborate on either its functional arrangement or the advantages to be derived therefrom.

One of the disadvantages of the type of engine just described is that the effective compression stroke and the effective expansion stroke of the piston are the same so it is apparent that the burnt gases will be exhausted before complete expansion has taken place. I have provided means whereby the engine may have a constant compression and a constant expansion but with this difference: The expansion stroke is greater than the compression stroke so that the full expansion value of the burnt gases may act on the piston to thereby increase the efficiency of the engine.

In order to accomplish the desired result I provide the port cuttings 16 and 17 in the two sleeve valves 2 and 3 and cause them to register with the opening 18 in the cylinder wall, the opening 18 communicating the interior of the working cylinder with a chamber 19 in which may be located the volumetric fluid as, for example, air. The chamber 19 may have a loaded valve 20 normally seated by the spring 21 and which will permit the valve 20 to unseat only upon a pressure drop in chamber 19. When the piston 8 moves on its effective fuel intake stroke, the ports 10 and 11 will register with the port 12 to permit a fuel charge to be drawn into the working cylinder or compression chamber of the engine.

The intake stroke of the piston will create a partial vacuum in the compression chamber until the top of the piston has moved past the port cuttings 16 and 17 which, at this time, will be registering with the port 18 to admit a volumetric fluid into the cylinder of the engine. The moment that the piston uncovers the ports 16 and 17, the volumetric fluid will rush into the cylinder to destroy the vacuum and equalize the pressure in the cylinder and it will continue to enter the cylinder until the piston has reached the limit of its intake stroke or until the crank shaft is at bottom dead center. The movement of the piston outwardly beyond the ports 17 and 18 is not part of the effective fuel intake stroke as such movement only causes volumetric fluid or air to enter the cylinder, the admission of the air being solely for the purpose of filling the space between the bottom of the compression chamber and the top of the piston. If the throttle for the engine is partially closed, there will be a greater vacuum created in the cylinder by the piston than would be the case if the throttle were open. Therefore, the greater the fuel charge, the lesser the volumetric charge and it is to be here noted that the volumetric charge is stratified with respect to the fuel charge so that as the piston moves on its compression stroke, part of the fluid entering from chamber 19 will pass out into the chamber again and only that portion of the fluid which is above the openings 17 and 18 will be trapped in the cylinder. As the cylinder moves up on its compression stroke, the fuel and whatever volumetric fluid has been trapped will be compressed and the fuel will then be combusted by a spark plug such as 22 or by some other suitable means. Then the piston will move on its expansion stroke and as it moves past the ports 16 in sleeve valve 3, the ports 16 will be out of register with the ports 17 so the burnt gases will continue to expand until the piston has reached about the position shown in Fig. 3.

Therefore, it will be apparent that the expansion ratio is considerably greater than the compression ratio and one feature of my invention is that the compression pressure will be the same, irrespective of the actual fuel introduced through the fuel inlet ports because, irrespective of what degree of vacuum is created in the cylinder by the intake stroke of the piston, this vacuum will be destroyed when the ports 16, 17 and 18 register to admit enough volumetric fluid into the cylinder to equalize the pressure therein.

The admission ports for the intake for the fuel and volumetric fluid are arranged about the axis of the cylinder so that the incoming fluid will enter the cylinder in a stratified condition. For example, the inlet ports 10 and 11 are arranged about 90 degrees apart and there are three of these ports which simultaneously admit the fuel charge to stratify with the trapped burnt gases; the fourth set of ports 13, 14, and 15 being exhaust ports, as will be clearly understood by reference to the drawings.

While I have preferred to show my invention as applied to the so-called Knight engine, it is not limited to such a construction because the same generic principle can be applied to a poppet valve engine, as will be apparent by reference to Fig. 5.

In Fig. 5 the cylinder 23 is shown as provided with the usual intake valve 24, there being an exhaust valve (not shown) and a spark plug 25. The engine functions like an ordinary poppet valve except that sleeved about the cylinder 23 is a sleeve valve 26 which is operated by a cam 27 on a cam shaft 28, receiving its motion in any appropriate manner from the main crank shaft 7. The sleeve valve 26 moves back and forth to cover and uncover the ports 29 in the cylinder. The lower port of the cylinder is preferably enclosed by a crank case 30 so that volumetric fluid may enter through the ports 29 from the crank case so, if desired, I may employ a valve like 20 in Fig. 1 to the crank case to admit a fresh supply of air in the vent that there is a pressure drop in the crank case or I may obtain the air through the usual breather valve. The valve 26 will function substantially like the valves 2 and 3 to alternately open and close the ports 29, the movement of the valve 26, of course, being timed with respect to the piston 31 which is driven from the crank 32 through the connecting rod 33.

It will be apparent from the foregoing that an engine constructed in accordance with my invention may have improved efficiency due to the fact that it has constant compression and constant expansion, the expansion ratio being greater than the compression ratio and that this can be accomplished by a reciprocatory valve in sleeved relation with the cylinder, an ideal condition being the application of my invention to the well known type of Knight engine although as above explained, the generic embodiment of my invention may partake of various forms.

In view of the fact that the volumetric fluid or air is stratified on top of the piston or between the piston and the fuel charge, it will be apparent that when the piston moves on its scavenging stroke all of the burnt gases will be forced out of the cylinder because they will be displaced by the stratified air, consequently complete scavenging of each cylinder will take place for each cycle of operations of each piston. Therefore the introduced fuel will not be impoverished by co-mingling with products of combustion. This is important because, as will readily be appreciated, the efficiency of the engine will be at its maximum, due in no small measure to the fact that each cylinder will be thoroughly scavenged, so the air functions both as a volumtric fluid and as a thorough scavenging medium.

The advantages gained by providing constant compression in the working chambers of the cylinders are as follow:

I provide a uniform high compression in the cylinders irrespective of the amount of the admitted fuel charge. As a result, the admitted minimum fuel charge will be under the same compression as the admitted maximum fuel charge; consequently the same efficiency will be maintained under all conditions.

Of course, in actual practice a sharp line of demarkation will not be maintained between the fuel and the volumetric air but it will be maintained for all practical purposes; for example, in that type of motor in which the working chamber of the cylinder has a uniform cross section there is no turbulence in the exploded charge, therefore, the volumetric fluid or air strata will not be appreciably disturbed. Hence it will not dilute the fuel mixture nor will it mix with the exploded charge to an extent sufficient to destroy the value of the volumetric air as a scavenging medium.

What I claim and desire to secure by Letters Patent is:

1. A reciprocatory internal combustion engine comprising a cylinder having a working chamber to receive fuel, combust it and exhaust the burnt gases, the cylinder having a portion extending below the effective compression portion of the working chamber, a reciprocatory piston in the cylinder having an expansion stroke in excess of its effective compression stroke, and a reciprocatory valve for admitting non-combustible volumetric fluid into the cylinder at about the end of the effective intake stroke of the piston.

2. A reciprocatory internal combustion engine comprising a cylinder functioning to receive fuel, combust it and exhaust the burnt gases, the cylinder having port cuttings at the end of the effective compression portion of the cylinder, a reciprocatory piston in the cylinder movable outwardly past the port cuttings, and a reciprocatory valve for uncovering the port cuttings at about the time the piston moves past the port cuttings during its intake stroke, the uncovering of the port cuttings being effective in admitting non-combustible volumetric fluid into the cylinder.

3. A reciprocatory internal combustion engine comprising a cylinder to receive fuel, combust it and exhaust the burnt gases, a reciprocatory piston in the cylinder having a movement beyond the point at which it is effective to draw fuel into the cylinder, and a reciprocatory valve to uncover ports in the cylinder to admit a non-combustible volumetric fluid thereinto at the end of the effective fuel intake stroke of the piston.

4. A reciprocatory internal combustion engine comprising a cylinder to receive fuel, combust it and exhaust the burnt gases, a reciprocatory piston in the cylinder having a movement beyond the point at which it is effective to draw fuel into the cylinder, and a reciprocatory valve to uncover ports in the cylinder to admit a non-combustible volumetric fluid thereinto at the end of the effective fuel intake stroke of the piston, the fuel fluid and the volumetric fluid being received in the cylinder in strata.

5. A reciprocatory internal combustion engine having a cylinder to receive fuel, combust it and exhaust the burnt gases, reciprocatory valve means for controlling the introduction of the fuel into the cylinder and the discharge of the burnt gases therefrom, the reciprocatory valve means being effective in admitting non-combustible volumetric fluid in strata into the cylinder at about the time the fuel intake ceases, and a piston in the cylinder having an effective expansion stroke greater than its effective compression stroke.

6. A reciprocatory internal combustion engine comprising a cylinder having a working chamber to receive fuel, combust it and exhaust the burnt gases, a piston in the cylinder, and a reciprocatory valve for admitting non-combustible volumetric fluid into the cylinder to maintain constant compression.

In testimony whereof I affix my signature.

FRANK A. BULLINGTON.